Patented Nov. 19, 1929

1,736,332

UNITED STATES PATENT OFFICE

JAMES C. VIGNOS, OF CANTON, OHIO

PICKLING PROCESS

No Drawing. Application filed August 29, 1928. Serial No. 302,893.

This invention relates to a process of removing metal oxides from the surface of metals and the invention pertains, especially, to the dissolving or removing of such oxides by a halogen compound in solution with or without the aid of an acid or acid substance.

My invention is based upon the fact that the additions of halogens to metallic salts in their lowest valency form are oxidized to salts of a higher valency having reducing properties. The addition of the halogen can take place in a dry state or in concentrated or dilute solution that is either neutral or acid. For example, chlorine gas passed into a dilute hydrochloric solution of cuprous chloride oxidizes it to cupric chloride. The cupric chloride will then dissolve copper and copper oxide. Chlorine gas passed into a dilute sulphuric acid solution of ferrous sulphate oxidizes it to ferri-sulphate-chloride and the salt formed will dissolve iron and iron oxide very readily. The same reactions can take place in a neutral solution as well.

In carrying out my invention, I immerse the metal covered with oxide into a solution of an acid, acid substance, or a mixture of an acid and acid substance of desired concentration. After a small amount of the oxide and metal has gone into solution I regulate the addition of the halogen or oxide halogen addition compounds (for example, $SO_2Cl_2$) so as to always keep in the solution an appreciable amount of the reducing compound formed by the addition of the halogen or oxide halogen addition compound. As more metal carrying oxides are immersed in the bath, the concentration of metallic salts increases, and the acid is diminished; the halogen additions and acid additions are so regulated that when the concentration of metallic salts reach the point where they begin to crystallize out and interfere with practice, there is only a small amount of available halogen and acid. The solution can then be diluted with water and the process continued indefinitely.

In the application of the above to the pickling of iron or steel containing oxides, a pickling bath is made up containing an acid or acid substance of desired concentration and heated to a suitable temperature. The iron or steel articles to be pickled are immersed in the acid bath and the process is the same at the start as is commonly employed, but as soon as there is an appreciable amount of ferrous sulphate in the pickling solution, I pass into it chlorine gas or sulphuryl chloride. The gas can be passed into the solution in the pickling tank in the presence of iron or steel, or it can be passed into the pickling solution in a separate container, or it can be circulated from the pickling tank into a treating container. If sulphuryl chloride is used, the following reaction takes place. $2FeSO_4 + SO_2Cl_2 = 2FeSO_4Cl + SO_2$ and the sulphur dioxide reduces the higher oxides to a lower more soluble form. If chlorine is used there is formed ferri-sulphate-chloride ($FeSO_4Cl$). The presence of this compound greatly increases the rate of dissolution of the scale and permits a longer working of the bath.

By this method pickling of iron and steel can be done in a neutral solution of ferri-sulphate-chloride and brittleness due to hydrogen penetration and blisters in sheets can be entirely avoided as there is no hydrogen evolution. Blisters are almost entirely avoided if the pickling is done by this method in a weak acid solution.

In pickling iron or steel in a solution of hydrochloric acid the same principle holds true as with sulphuric acid. The ferrous chloride formed by the action of the acid on the metal and oxide by coming in contact with chlorine or sulphuryl chloride is changed to ferric chloride. The ferric chloride when in contact with the oxide or metal is reduced to ferrous chloride. This process is likewise continuous and has the same advantages.

This process is especially suited for pickling iron and steel that is to be galvanized, tinned or coated with another metal or painted. In galvanizing and tinning the blistering of sheets is avoided and a tight coat of metal is easily produced. In pickling iron or steel in a solution of hydrochloric acid the same holds true as in pickling with sulphuric acid or ferri-sulphate-chloride. The ferrous chloride formed by the action of the acid on the oxide and metal is changed to ferric chloride by passing chlorine into the solution. Sulphuryl chloride has the same action. The ferric chloride makes a very good pickling agent and especially when in solution with ferri-sulphate-chloride.

The following tests bear out the above assertions. The halogen pickling compound used in all the following tests was made by passing chlorine gas into a normal solution of ferrous-sulphate until nearly saturated with chlorine. The solution was evaporated under reduced pressure until the solution when allowed to stand formed yellow crystals. On analysis these crystals give 10.2% chlorine. The theoretical chlorine per cent for the compound is 11.95%.

Test No. 1

Test pieces 3 x 3" cut from the same sheet of steel and weighing approximately 22 grams were pickled to remove all scale; then dried and weighed and immersed in 500 cc. of solution maintained at 80°–85° C. for one hour.

| Solution | Number of tests | Average iron loss in grams |
|---|---|---|
| 1. 10 grams FeSO₄Cl | 2 | .5635 |
| 2. 20 grams FeSO₄Cl | 2 | 1.2050 |
| 3. 30 grams FeSO₄Cl | 3 | 1.8475 |
| 4. 45 grams FeSO₄Ol | 2 | 2.9110 |
| 5. 62 grams FeSO₄Cl | 3 | 2.9165 |
| 6. 10 grams FeSO₄Cl+8% H₂SO₄ | 2 | .7950 |
| 7. 15 grams FeSO₄Cl+8% H₂SO₄ | 2 | 1.3715 |
| 8. 30 grams FeSO₄Cl+8% H₂SO₄ | 2 | 1.4620 |
| 9. 10 grams FeSO₄Cl+4% H₂SO₄ | 2 | .6095 |
| 10. 30 grams FeSO₄Cl+4% H₂SO₄ | 2 | .8723 |
| 11. 45 grams FeSO₄Ol+4% H₂SO₄ | 2 | 1.6930 |
| 12. 20 grams FeSO₄Cl+2% H₂SO₄ | 3 | .8960 |

Test No. 2

Test pieces 3 x 3" were cut from the same sheet of steel that had been box annealed and the test pieces weighing approximately 74 grams were immersed in 500 cc. of 8% H₂SO₄, maintained at 80°–85° C. during the entire test.

| Solution additions | Number of tests | Fe loss in grams at the end of 15 minutes | Fe loss in grams at the end of 45 minutes | Total Fe loss in grams |
|---|---|---|---|---|
| 1. 10 grams FeSO₄Cl | 2 | 1.0195 | .3560 | 1.3755 |
| 2. 20 grams FeSO₄Cl | 2 | 1.2100 | .4980 | 1.7080 |
| 3. 30 grams FeSO₄Cl | 2 | 1.2600 | .6365 | 1.8965 |
| 4. 40 grams FeSO₄Ol | 2 | 1.2595 | .9435 | 2.2030 |

Test No. 3

*Monel metal.*—Test pieces 3x3" cut from filter screen, weighing approximately 16 grams were heated to redness to remove any oil and to put on a thin film of oxide. These pieces immersed for one hour in 500 cc. of solution kept between 80°–85° C. for one hour.

| Solution | Number of tests | Average metal loss in grams |
|---|---|---|
| 1. 10 grams FeSO₄Cl | 2 | .5940 |
| 2. 20 grams FeSO₄Cl | 2 | .8400 |
| 3. 30 grams FeSO₄Cl | 2 | 1.3825 |
| 4. 40 grams FeSO₄Cl | 2 | 2.4765 |
| 5. 5 grams FeSO₄Cl + 8% H₂SO₄ | 2 | .5015 |
| 6. 10 grams FeSO₄Cl + 8% H₂SO₄ | 2 | .6670 |
| 7. 20 grams FeSO₄Cl + 8% H₂SO₄ | 2 | .8230 |
| 8. 40 grams FeSO₄Cl + 8% H₂SO₄ | 2 | 1.3550 |
| 9. 10 grams FeSO₄Cl + 15% Acid | 3 | .3998 |
| 10. 20 grams FeSO₄Ol + 15% Acid | 2 | .6455 |
| 11. 30 grams FeSO₄Cl + 15% Acid | 3 | 1.1955 |
| 12. 40 grams FeSO₄Cl + 15% Acid | 2 | 1.1215 |

Test No. 4

The solution Nos. 3 and 4 from Test No. 3 were put together and the volume made up to one liter. It was filtered to remove precipitate. The chlorine present in the clear solution was 3.36%. Chlorine was passed into the solution until the color had changed from a bright green to a dark brown. The chlorine present was 9.62%. Two test pieces were then placed into the solution, heated to 80° C. The metal loss was 5.0155 grams. There was no precipitate formed. Chlorine was again passed into the solution and this process was repeated five times with no slowing up of the action.

Test No. 5

The solution from Nos. 6 and 7 of Test No. 3 were put together and volume brought up to one liter. There was no precipitate in this case. The chlorine present in the clear solution was 2.24%. Chlorine was passed in until the solution had reached 3.64% Cl. Two test pieces were placed into the solution, heated to 80° C. The metal loss was 3.0155 grams. The process was repeated seven times and the total metal dissolved was 26.43 grams.

Test No. 6

The solutions Nos. 3 and 4 from Test No. 2 were treated in the same manner as solutions in Tests 4 and 5. After repeating the process 6 times, the total iron dissolved was 12.227 grams.

The above tests do not in any manner limit the invention to the pickling of the metals used in the various tests, but show its practicability and to one familiar with the art of pickling its wide application to pickling of iron, steel, alloy steels and iron, and non-ferrous metals.

I claim:

1. The process for pickling metals which consists in immersing the metal into a pickling solution and passing a halogen into the solution.

2. The process for pickling metals which consists in immersing the metal into a pickling solution and passing chlorine into the solution.

3. The process for pickling iron and steel, and alloys of both, which consists in immersing the metal into a pickling solution containing ferrous sulphate and passing a halogen into the solution.

4. The process for pickling iron and steel, and alloys of both, which consists in immersing the metal into a pickling solution containing ferrous sulphate and passing chlorine into the solution.

5. The process for pickling iron and steel, and alloys of both, which consists in immersing the metal into a pickling solution containing ferrous sulphate and an acid or acid substance, and passing a halogen into the solution.

6. The process for pickling iron and steel, and alloys of both, which consists in immersing the metal into a hot pickling solution containing ferrous sulphate and an acid or acid substance, and passing chlorine into the solution.

7. The process for pickling iron and steel, and alloys of both, which consists in immersing the metal into a hot pickling solution containing ferrous chloride and an acid or acid substance, and passing chlorine into the solution.

8. A pickling solution for metals, containing ferri-sulphate-chloride.

9. A pickling solution for metals, containing ferri-sulphate-chloride, and an acid or acid substance.

In testimony that I claim the above, I have hereunto subscribed my name.

JAMES C. VIGNOS.